(12) United States Patent
Li et al.

(10) Patent No.: US 11,193,838 B2
(45) Date of Patent: Dec. 7, 2021

(54) METHOD FOR DETERMINING PLANE STRESSES ON IN-SERVICE STEEL STRUCTURE MEMBER BASED ON PHASE SPECTRUM OF ULTRASONIC TRANSVERSE WAVE

(71) Applicant: Harbin Institute of Technology, Shenzhen, Guangdong (CN)

(72) Inventors: Zuohua Li, Guangdong (CN); Nanxi Liu, Guangdong (CN); Diankun Liu, Guangdong (CN); Yingzhu Wang, Guangdong (CN); Jun Teng, Guangdong (CN)

(73) Assignee: Harbin Institute of Technology, Shenzhen, Shenzhen (CN)

( * ) Notice: Subject to any disclaimer, the term of this patent is extended or adjusted under 35 U.S.C. 154(b) by 155 days.

(21) Appl. No.: 16/716,504

(22) Filed: Dec. 17, 2019

(65) Prior Publication Data
US 2020/0217730 A1      Jul. 9, 2020

(30) Foreign Application Priority Data
Jan. 8, 2019   (CN) .......................... 201910014154.9

(51) Int. Cl.
*G01L 1/25*     (2006.01)
*G01N 29/04*    (2006.01)
(Continued)

(52) U.S. Cl.
CPC ............ *G01L 1/255* (2013.01); *G01N 29/043* (2013.01); *G01N 29/07* (2013.01); *G01N 29/12* (2013.01);
(Continued)

(58) Field of Classification Search
CPC .. G01M 5/0041; G01M 5/0066; G01N 29/07; G01N 29/12; G01N 29/043;
(Continued)

(56) References Cited

U.S. PATENT DOCUMENTS 9,989,498 B2 * 6/2018 Lanza di Scalea .... G01N 29/46
10,345,269 B2 * 7/2019 Lee ......................... G01N 29/11
(Continued)

FOREIGN PATENT DOCUMENTS

| CN | 1040094 A | 2/1990 |
|----|-----------|--------|
| CN | 1266182 A | 9/2000 |

(Continued)

*Primary Examiner* — Jacques M Saint Surin

(57) ABSTRACT

A method for determining plane stresses on an in-service steel structure member based on phase spectrum of ultrasonic transverse wave, including: calibrating stress-spectrum parameters k and c of a replica of the in-service steel structure member; determining a first response frequency of a phase difference and a maximum value of a derivative function of the phase difference of an ultrasonic transverse wave echo of the in-service steel structure member, and obtaining a polarization angle of ultrasonic transverse wave components generated by a birefringence effect; solving a plane normal stress difference and a plane shear stress inside the in-service steel structure member; and separating normal stresses by a shear difference method to obtain three independent plane stress components.

9 Claims, 9 Drawing Sheets

(51) Int. Cl.
    *G01N 29/07*     (2006.01)
    *G01N 29/12*     (2006.01)

(52) U.S. Cl.
    CPC ............. *G01N 2291/011* (2013.01); *G01N 2291/0234* (2013.01); *G01N 2291/0289* (2013.01)

(58) Field of Classification Search
    CPC ............. G01N 29/075; G01N 29/30; G01N 2291/011; G01N 2291/0234; G01N 2291/02827; G01N 2291/0289; G01N 2291/101; G01L 1/255
    USPC .......................................................... 73/636
    See application file for complete search history.

(56) References Cited

U.S. PATENT DOCUMENTS

| | | | |
|---|---|---|---|
| 10,416,120 B2 * | 9/2019 | Petculescu | G01N 29/12 |
| 2008/0047347 A1 * | 2/2008 | Sato | G01N 29/043 73/597 |
| 2015/0377836 A1 * | 12/2015 | Lanza di Scalea | G01N 29/11 73/598 |
| 2018/0045683 A1 * | 2/2018 | Lee | G01N 29/221 |

FOREIGN PATENT DOCUMENTS

| | | | | |
|---|---|---|---|---|
| CN | 107063526 A | | 8/2017 | |
| DE | 102011011784 | * | 8/2012 | ............. G01N 29/07 |
| EP | 001780539 A1 | * | 5/2007 | ............. G01N 29/07 |

* cited by examiner

METHOD FOR DETERMINING PLANE STRESSES ON IN-SERVICE STEEL STRUCTURE MEMBER BASED ON PHASE SPECTRUM OF ULTRASONIC TRANSVERSE WAVE

CROSS-REFERENCE TO RELATED APPLICATIONS

This application claims the benefit of priority from Chinese Patent Application No. 201910014154.9, filed on Jan. 8, 2019. The content of the aforementioned application, including any intervening amendments thereto, is incorporated herein by reference in its entirety.

TECHNICAL FIELD

The present disclosure relates to stress non-destructive determination of steel structure member, and more particularly to a method for determining plane stresses on an in-service steel structure member based on phase spectrum of ultrasonic transverse wave.

BACKGROUND OF THE INVENTION

With the development of economy, science and technology, a great progress has been made to the infrastructure construction, especially the construction steel structures. However, the infrastructure is constantly subjected to external loads when it is used as a shelter for the human being. These external loads include loads generated under normal use and loads caused by external uncertainties. In addition, long-term use may result in significant decrease in the safety status of the infrastructure, and the stress state has been considered as an important indicator to evaluate the safety performance of an in-service steel structure member.

Currently, there are various methods for determining the axial stress of steel member based on acousto elasticity. However, since the wave velocity is not sensitive to changes in stress, there are many defects in the ultrasonic method for determining stress based on acousto elasticity, for example, the zero-stress state is required to be obtained; the time domain features are difficult to distinguish; and it is difficult to ensure the accuracy, greatly limiting its application and making it only effective in the relatively simple axial stress determination of an in-service steel structure member.

Given the above, the disclosure provides a method based on a birefringence effect of the transverse wave and the spectrum analysis, which realizes the stress determination of the in-service steel structure member and well overcomes the defects in the use of an acoustic time method. In this method, the echo signals are significantly differentiated in the frequency domain, and the data points of the zero-stress state are not special in the application of the spectrum analysis Moreover, the spectral features are used as processing parameters, which can ensure the full use of the useful information of the spectrum, providing a higher reliability and a higher stress determination precision. The disclosure introduces the spectrum analysis into the ultrasonic stress determination, which facilitates the further application of the ultrasonic non-destructive determination in the field of stress non-destructive determination.

At present, the research on the ultrasonic stress determination is mainly focused on the determination of axial stress. However, the actual engineering stress state is more complicated, and for most of the in-service steel structure members, the determination of the plane stresses is the key to understand the true stress state of the in-service steel structure member. In the actual engineering, some workpieces, such as deep beams and curved gate and piers, are in a plane stress state, while for some workpieces in spatial stress state, engineers often ignore a stress in a certain direction that has a less effect to simplify the stress state into a plane stress state, simplifying the problem. In fact, when the force analysis of engineering members is carried out, the stress of a considerable number of the workpieces can be regarded as the plane stress, such that the ultrasonic determination of the plane stresses is of great significance for the popularization and application of stress determining technology in the practical engineering. In the research of the disclosure on the plane stress determination, the stress components to be determined are increased from one to three, which includes the shear stress, rendering the stress determination more applicable.

In summary, in view of the defects in the axial stress non-destructive determining method based on the acousto elasticity and the complexity in the actual stress state of the components, the disclosure introduces the spectrum analysis to establish a method for determining plane stresses on an in-service steel structure member based on phase spectrum of ultrasonic transverse wave, which is of great significance for improving the accuracy of ultrasonic stress determination and facilitating the popularization and application thereof in practical engineering.

SUMMARY OF THE INVENTION

In order to overcome the defects of the prior art, the application provides a method for determining plane stresses on an in-service steel structure member based on phase spectrum of ultrasonic transverse wave to achieve the non-destructive determination for the plane stresses of the in-service steel structure member.

The technical solutions of the disclosure are described as follows.

The disclosure provides a method for determining plane stresses on an in-service steel structure member based on phase spectrum of ultrasonic transverse wave, including:

step (1) calibrating stress-spectrum parameters k and c of a replica of the in-service steel structure member;

step (2) determining a first response frequency of a phase difference of an ultrasonic transverse wave echo and a maximum value of a derivative function of the phase difference of the in-service steel structure member to obtain a polarization angle of ultrasonic transverse wave components generated by a birefringence effect of the ultrasonic transverse wave;

step (3) solving a plane normal stress difference and a plane shear stress inside the in-service steel structure member; and step (4) separating normal stresses by a shear difference method to obtain three independent plane stress components.

In an embodiment, the ultrasonic transverse wave is transmitted and received by a transmitting-receiving ultrasonic transverse wave probe, of which a center frequency is 5 MHz, and a bandwidth is 0~10 MHz. Further, the selected ultrasonic waveform is the ultrasonic transverse wave. An acoustic time difference of ultrasonic transverse wave components generated by a birefringence effect of the ultrasonic transverse wave is related to spectral characteristics of the ultrasonic transverse wave echo spectrum, which can be used to derive a plane stress determination formula of the in-service steel structure member based on the ultrasonic transverse wave phase spectrum.

In an embodiment, step (1) further includes:
preparing the replica of the in-service steel structure member for calibrating the stress-spectrum parameters.

Further, in step (2), the first response frequency of the phase difference and the maximum value of the derivative function of the phase difference are obtained by the steps of: allowing a signal transmitted by a transmitting-receiving ultrasonic transverse wave probe to propagate in the in-service steel structure member and receiving an echo signal by the transmitting-receiving ultrasonic transverse wave probe; collecting the signal by an oscilloscope, and processing the data to obtain a function curve of the phase difference and further obtaining a derivative function curve of the phase difference of the ultrasonic transverse wave echo, where a frequency corresponding to the first maximum value point in the derivative function curve of the phase difference is the first response frequency of the phase difference, and a value corresponding to a maximum value point in the derivative function curve of the phase difference is the maximum value of the derivative function of the phase difference.

In an embodiment, the process of collecting data by oscilloscope comprises the following steps: transmitting, by an ultrasonic pulse emission receiver, a pulse electrical signal; converting, by the transmitting-receiving ultrasonic transverse wave probe, the pulse electrical signal into an ultrasonic transverse wave signal; allowing the ultrasonic transverse wave signal to propagate in the in-service steel structure member and to be reflected by a bottom surface of the in-service steel structure member; converting, by the transmitting-receiving ultrasonic transverse wave probe, the ultrasonic transverse wave signal into an electrical signal; inputting, by the transmitting-receiving ultrasonic transverse wave probe, the electrical signal to the ultrasonic pulse emission receiver; collecting, by the oscilloscope, the signal.

In an embodiment, the ultrasonic pulse emission receiver is an ultrasonic pulse emission receiver of type 5072PR produced by the Olympus company.

In an embodiment, in step (1), the stress-spectrum parameters k and c are undetermined parameters in a theoretical formula derived herein to determine the plane stress of the replica of the in-service steel structure member based on the phase spectrum, which are used to characterize the elastic coefficient and the thickness of the member material. The stress-spectrum parameters k and c satisfy the following equations:

$$k = \frac{1}{4mt_0} = \frac{1}{4t_0} \cdot \frac{-8\mu^2}{4\mu+n} \text{ and } c = \frac{B_0}{m} = \frac{-8\mu^2}{4\mu+n} \cdot B_0,$$

where, m is an elastic coefficient of the in-service steel structure member and the replica thereof; $t_0$ is an acoustic time of the transverse wave propagating in the in-service steel structure member and the replica thereof in an unstressed state; $\mu$ is a second order elastic constant; n is a third order elastic constant; $B_0$ is a birefringence coefficient of the transverse wave when the in-service steel structure member is in the unstressed state.

In an embodiment, in step (1), the stress-spectrum parameters k and c are calibrated as follows. Parameters in the axial stress determination formula and the plane stress determination formula are the same in number and meaning. Multiple pairs of reciprocals of the first response frequency of the phase difference and stresses are obtained by performing an axial loading test on the replica of the in-service steel structure member. The stress-spectrum parameters k and c for the plane stress determination are obtained by fitting the obtained data pairs. The replica of the in-service steel structure member used in parameter calibration has the same material and thickness as the in-service steel structure member to be tested.

In an embodiment, the phase difference is a difference value between a phase spectrum of an echo received when an incident direction of the ultrasonic transverse wave rotates by 90 degrees and a phase spectrum of an echo received in an original incident direction of the ultrasonic transverse wave.

In an embodiment, the phase difference is expressed as follows:

$$\Delta\varphi = 2\arctan(\tan(\pi fP)\cdot\cos(2(\theta-\varphi))),$$

where P is an acoustic time difference of ultrasonic transverse wave components generated by a birefringence effect, $$P = \frac{2l}{v_{31}} - \frac{2l}{v_{32}};$$

l represents the thickness of the in-service steel structure member and the replica thereof; $v_{31}$ is a velocity of a transverse wave which has a propagation direction and a polarization direction both perpendicular to the stress; $v_{32}$ is a velocity of a transverse wave which has a propagation direction perpendicular to the stress and a polarization direction parallel to the stress; f is the frequency; $\theta$ is the incident angle of the ultrasonic transverse wave; and $\varphi$ is the polarization angle of the transverse wave components.

In an embodiment, the derivative function of the phase difference of the ultrasonic transverse wave echo is expressed as:

$$\Delta\varphi' = \begin{cases} \dfrac{2\pi P\sec^2(\pi Pf)\cos(2(\theta-\varphi))}{1+\tan^2(\pi Pf)\cos^2(2(\theta-\varphi))} & \left(f \neq \dfrac{2N-1}{2P}\right) \\ 2\pi P\sec(2(\theta-\varphi)) & \left(f = \dfrac{2N-1}{2P}\right) \end{cases},$$

$(N = 1, 2, 3, \ldots)$, where, P, f, $\theta$, $\varphi$ are defined as above.

In an embodiment, under the plane stress state, the polarization angle of the transverse wave components is determined by the principal stress and the properties of the material itself. The polarization angle of the ultrasonic transverse wave components is obtained by the following steps: simultaneously capturing an abscissa (i.e., the first response frequency of the phase difference) and an ordinate (i.e., the maximum value of the derivative function of the phase difference) of the first maximum value point in the phase difference derivative function curve obtained through the signal processing; obtaining the polarization angle of the ultrasonic transverse wave components by a theoretical formula for capturing the polarization angle in the case that the incident angle is measurable and known. In some embodiments, a better stress determination can be achieved when the initial incident angle of the ultrasonic transverse wave is around 45 degrees.

In an embodiment, in step (2), the polarization angle of the ultrasonic transverse wave components is obtained by the following steps: recording an incident angle of the ultrasonic transverse wave; simultaneously capturing an abscissa (i.e., the first response frequency of the phase difference) and an ordinate (i.e., the maximum value of the derivative function of the phase difference) of the first maximum value point in the derivative function curve of the phase difference; and obtaining the polarization angle of the ultrasonic transverse wave components by a theoretical formula for capturing the polarization angle. The theoretical formula for capturing the polarization angle is expressed as:

$$\varphi = \theta - \frac{1}{2}\text{arcsec}\frac{\Delta\varphi' f_{max}}{\pi},$$

where, $\theta$ is the incident angle of the ultrasonic transverse wave; $\Delta\varphi'$ is the maximum value of the derivative function of the ultrasonic echo phase difference; $f_{max}$ is the frequency corresponding to the first maximum value point in the derivative function curve of the phase difference, i.e., the first response frequency of the phase difference.

In an embodiment, the in-service steel structure member is a thin plate member, that is, the dimension in the thickness direction is smaller than that in the other two directions. The external force and the constraint are parallel to the plate. In the real projects, the thin plate member can be extrapolated to the in-service steel structure member which is under three-dimensional stress and has a negligible stress in one direction.

The plane stresses are the absolute stresses of the in-service steel structure member in the current state, that is, two normal stresses and one shear stress, which are not intended to characterize the variations of the plane stresses.

In an embodiment, the first response frequency of the phase difference curve i.e., the frequency corresponding to the first maximum value point in the derivative function curve of the phase difference, is expressed as follows:

$$f_{max} = \frac{1}{2P},$$

where P is an acoustic time difference of ultrasonic transverse wave components generated by a birefringence effect, $$P = \frac{2l}{v_{31}} - \frac{2l}{v_{32}};$$

l represents the thickness of the in-service steel structure member and the replica thereof; $v_{31}$ is the velocity of a transverse wave which has a propagation direction perpendicular to the is the stress and a polarization direction perpendicular to the stress; $v_{32}$ is the velocity of a transverse wave which has a propagation direction perpendicular to the stress and a polarization direction parallel to the stress.

In an embodiment, the solving process of the normal stress difference and the shear stress inside the in-service steel structure member is described as follows. The measured incident angle $\theta$ of the ultrasonic transverse wave, the first response frequency $f_{max}$ and the derivative function maximum value $\Delta\varphi'$ of the phase difference of the ultrasonic transverse wave echo determined in a working stress state are substituted into the theoretical formula for capturing the polarization angle to obtain the polarization angle $\varphi$. The stress-spectrum parameters k and c are then calibrated. Finally, k, c, $\varphi$ and $f_{max}$ are substituted into a plane stress determination formula which is expressed as follows:

the normal stress difference: $\sigma_x - \sigma_y = \frac{k\cos 2\varphi}{f_{max}} - c,$ the shear stress: $\tau_{xy} = \frac{k\sin 2\varphi}{2f_{max}},$ where: stress-spectrum parameter k, MHz·MPa; c, MPa; and $\sigma_x$, $\sigma_y$, $\tau_{xy}$, MPa.

The obtained $\sigma_x$-$\sigma_y$ and $\tau_{xy}$ are respectively the normal stress difference and the shear stress of the in-service steel structure member under a working stress state. The formula for separating the normal stresses is obtained by shear difference method to separate the normal stresses and obtain the three independent plane stress components $\sigma_x$, $\sigma_y$, $\tau_{xy}$.

The formula for separating the normal stresses is expressed as:

$$(\sigma_x)_p = (\sigma_x)_0 - \sum_0^p \frac{\partial \tau_{xy}}{\partial y}\Delta x.$$

Compared to the prior art, the beneficial effects of the disclosure are described as follows.

(1) The method provided herein can realize the non-destructive determination for the plane stresses inside the steel structure members in construction and in service. Since the axial stress is a special case of the plane stress, the method through the simplification can also be applied to the determination of axial stress, and has a good applicability.

(2) At present, when the plane stresses are determined by the ultrasonic method based on the acousto elasticity, the operation is complicated and the precision is difficult to ensure. While the method provided herein can overcome the deficiencies of the above method, and can quantitatively calculate the polarization angle by substituting the first response frequency and the derivative function maximum value of the phase difference into the corresponding formula in the case that the incident angle is measurable and known. In addition, the method of the disclosure is easy to operate and has high precision.

(3) The method provided herein can be directly used to study the relationship between ultrasonic transverse wave echo and stresses by capturing the spectral characteristics in the frequency domain to establish a relationship with the plane stresses. In this method, the difference of echo signals is obvious in the frequency domain, allowing for a high sensitivity.

In summary, the method for determining plane stresses on an in-service steel structure member based on phase spectrum of ultrasonic transverse wave provided herein realizes the non-destructive determination of the plane stresses of the in-service steel structure member. This method does not involve high requirements for the sampling rate of the data acquisition system during the determination, and is less affected by the environmental high-frequency noise. Moreover, the instruments involved in this method are easy to install, low in cost and easy to operate. This method can be used for plane stress determination of steel structure member in construction and in service, and can also be applied to the determination of welding residual stress and loading stress of other metal components.

DETAILED DESCRIPTION OF EMBODIMENTS

This application will be further illustrated below with reference to the embodiments.

The principle of the method for determining plane stresses on an in-service steel structure member based on phase spectrum of ultrasonic transverse wave provided herein is described as follows.

Figure 1:
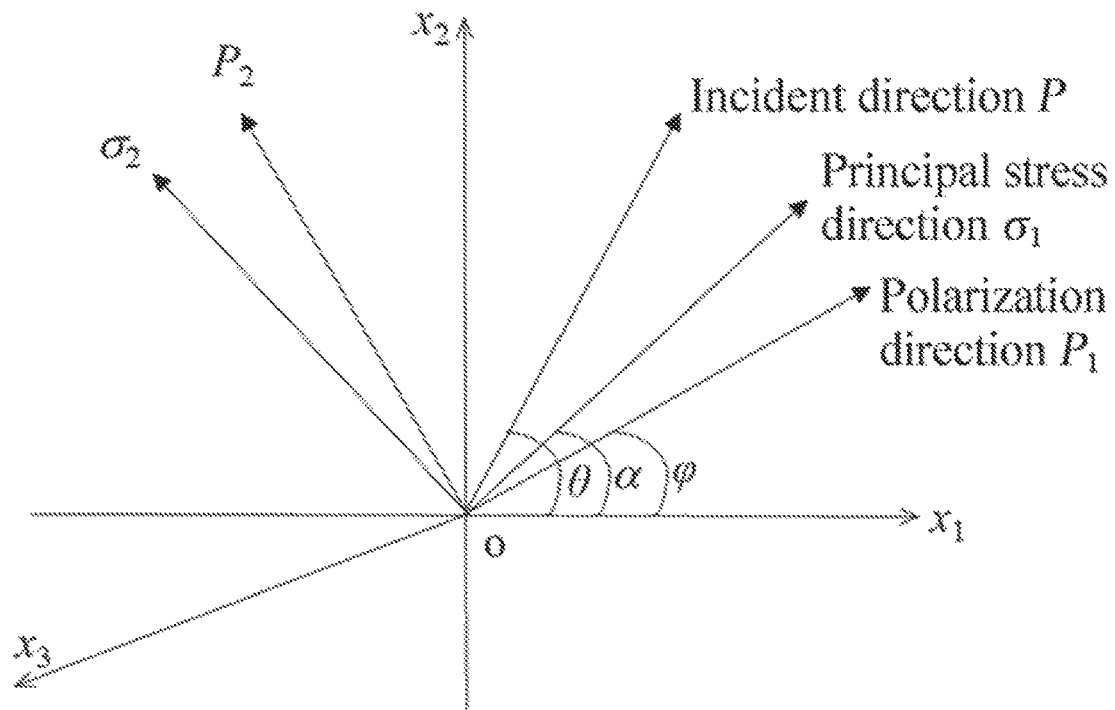
FIG. 1 is a schematic diagram showing the birefringence effect of a slightly orthotropic material in a plane stress state.

The coordinate system used in the theoretical formula derivation of the invention is schematically shown in FIG. 1. The origin is a position where the ultrasonic transverse wave probe is in contact with the in-service steel structure member. Under the action of the plane stress, transverse wave components generated by birefringence rotate from an orthotropic symmetry axis of the in-service steel structure member to a principal stress direction. $\theta$ is an incident angle of the ultrasonic transverse wave, $\varphi$ is a polarization angle of the ultrasonic transverse wave components, $\alpha$ is an angle between the principal stress and the horizontal axis of the in-service steel structure member, and $x_3$ direction is the propagation direction of the ultrasonic transverse wave.

The ultrasonic transverse wave transmitted by the ultrasonic transverse wave probe enters the in-service steel structure member, and then decomposed into two transverse wave components under the action of plane stresses, where the two transverse wave components have perpendicular polarization directions and different propagation velocities. The propagation direction of the two transverse wave components is perpendicular to the stress plane. Under the action of the plane stress, the polarization direction of the two transverse wave components does not follow the orthotropic symmetry axis of the in-service steel structure member, but has a certain angle with the orthotropic symmetry axis. This phenomenon is named as the birefringence which is unique to the ultrasonic transverse wave. In the invention, the angle between the incident direction and the polarization direction is referred to as an azimuth of the transverse wave.

In the invention, y(t) represents the vibration amplitude of the vibration source o; t represents the acoustic time of the wave; l represents the thickness of the in-service steel structure member and the replica thereof; $v_{31}$ is the velocity of a transverse wave having a propagation direction perpendicular to the stress, and a polarization direction perpendicular to the stress; $v_{32}$ is the velocity of a transverse wave having a propagation direction perpendicular to the stress and a polarization direction parallel to the stress.

An ultrasonic echo vibration equation synthesized by the two transverse wave components generated by the birefringence effect after being reflected from the bottom surface of the in-service steel structure member to the probe can be obtained in the combination of the birefringence effect and spectral analysis technique with the existing wave equation. The ultrasonic echo vibration equation is expressed as follows:

$$u_r(t) = y\left(t - \frac{2l}{v_{31}}\right)\cos^2(\theta - \varphi) + y\left(t - \frac{2l}{v_{32}}\right)\sin^2(\theta - \phi) \quad (1)$$

for simplicity, $$a = \frac{2l}{v_{31}} \quad (2)$$

$$b = \frac{2l}{v_{32}} \quad (3)$$

$$P = \frac{2l}{v_{32}} - \frac{2l}{v_{31}} \quad (4)$$

$$Q = \frac{2l}{v_{31}} + \frac{2l}{v_{32}} \quad (5)$$

equations (2) and (3) are substituted into (1) to obtain the following equation:

$$u_r(t) = y(t-a)\cos^2(\theta-\varphi) + y(t-b)\sin^2(\theta-\varphi) \quad (6)$$

$u_r(f)$, $u_0(f)$ are defined as Fourier transforms of $u_r(t)$ and y(t), the time domain relationship among parameters is converted into the frequency domain relationship, and the following equation is obtained:

$$u_r(f) = u_0(f)\cos^2(\theta-\varphi)e^{-i2\pi f a} + u_0(f)\sin^2(\theta-\varphi)e^{-i2\pi f b} \quad (7)$$

$\varphi_r(f)$ and $\varphi_0(f)$ are defined as phases respectively corresponding to $u_r(f)$ and $u_0(f)$, and phases corresponding to each frequency point are obtained through the following equation:

$$\varphi_r(f) = \varphi_0(f) - (\pi f Q + \arctan(\tan(\pi f P)\cos(2(\theta-\varphi)))) \quad (8).$$

According to formula (8), the phase value of the echo received from the bottom surface of the in-service steel structure member when the ultrasonic transverse wave probe is rotated by 90 degrees can be obtained as follows:

$$\varphi'_r(f) = \varphi_0(f) - \pi f Q + \arctan(\tan(\pi f P)\cos(2(\theta-\varphi))) \quad (9).$$

According to the above formulas (8) and (9), the phase difference function is shown as follows:

$$\Delta\varphi = \varphi'_r(f) - \varphi_r(f) = 2\arctan(\tan(\pi f P)\cos(2(\theta-\varphi))) \quad (10).(9).$$

The relationship between the phase difference and the acoustic time difference P of the transverse wave components is analyzed. It is found that when the acoustic time difference of the transverse wave components increases, the slope of the phase difference function becomes larger, that is, the derivative function of the phase difference and the acoustic time difference of the transverse wave components have a certain positive correlation. Due to the acousto elastic theory, the propagation velocity of the transverse wave components will be affected by the stresses of the in-service steel structure member. Therefore, the acoustic time difference of the transverse wave components and the stresses are closely related. Theoretical formula of the stress determination is explored by analyzing the derivative function of the phase difference of the ultrasonic transverse wave echo. In the actual determination, when the ultrasonic transverse wave probe is fixed on the in-service steel structure member, the acoustic time difference P of the transverse wave birefringence components is also determined. In the theoretical analysis, the derivative function curve of the phase difference is obtained as shown in FIG. 15 by assuming that P is 100.

Figure 15:
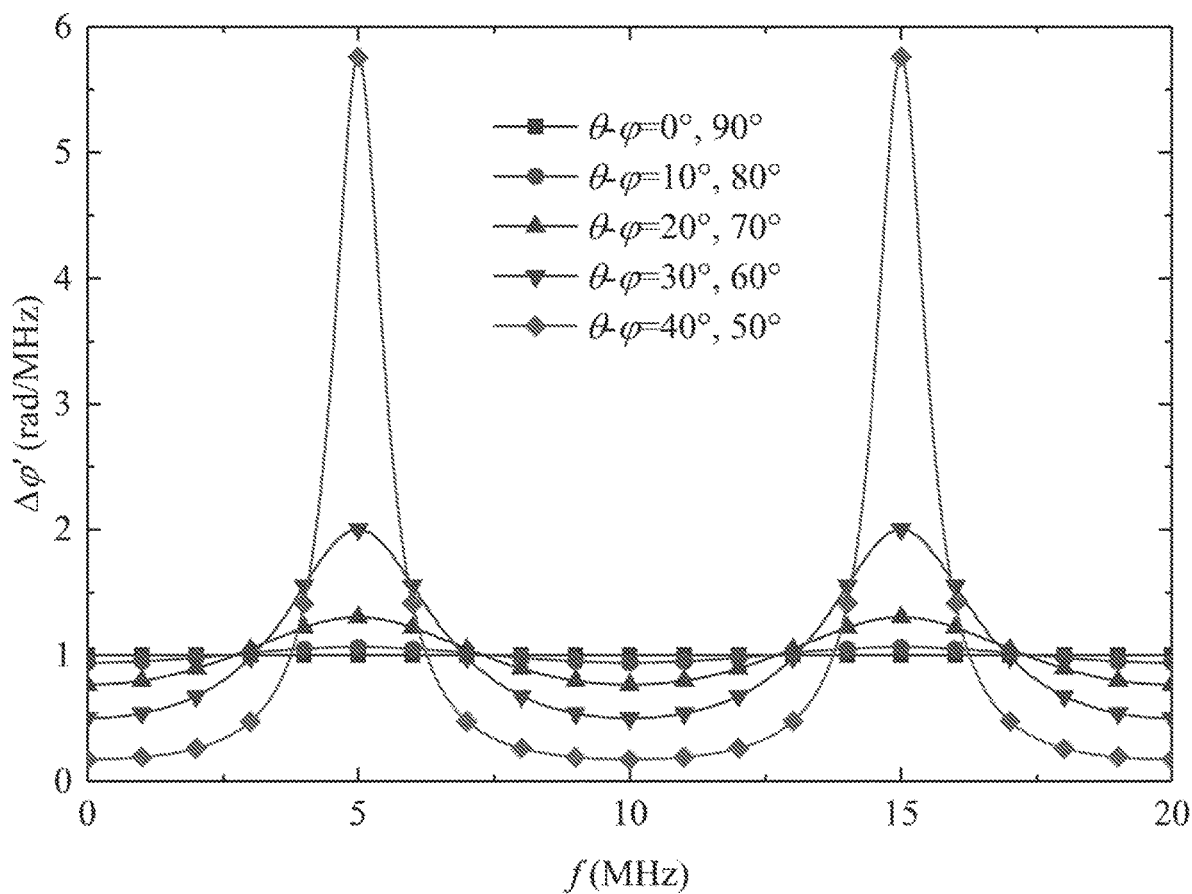
FIG. 15 shows a derivative function curve of the phase difference of the ultrasonic transverse wave echo at different incident angles according to the invention.

It can be found from FIG. 15 that when the incident angle of the transverse wave is determined, the derivative function of the phase difference has periodic maximum values. In the invention, the frequency corresponding to the maximum point is referred to as the response frequency. The relationship between the response frequency and the acoustic time difference of the transverse wave components is shown as follows:

$$f_{max} = \frac{2N-1}{2P}, (N=1, 2, 3, \dots). \quad (11)$$

It is required to handle the formula (11) in the stress determination based on the phase spectrum for the in-service steel structure member, where a period parameter N exists and needs to be determined. By processing the phase difference of the ultrasonic transverse wave echo obtained by test, it is found that the first maximum value point in the derivative function curve of the phase difference is obvious in a frequency band of 0 to 10 MHz. Since it is finally necessary to capture the frequency corresponding to the maximum value of the derivative function of the phase difference to achieve the determination of stresses, the target frequency band is selected to be 0~10 MHz to facilitate the data reading and analysis in this embodiment. Therefore, N is set to 1, and the theoretical formula for calculating the first response frequency of the phase difference curve is shown as follows:

$$f_{max} = \frac{1}{2P} \quad (12)$$

where, $f_{max}$ is the frequency corresponding to the first maximum value point in the derivative function curve of the phase difference. It can be seen from equation (12) that the acoustic time difference of the in-service steel structure member shows a linear relationship with the reciprocal of the first response frequency.

At present, it is shown in the researches on stress determination based on spectrum of ultrasonic transverse wave that the two transverse wave components generated by the birefringence effect are driven to rotate from an orthotropic symmetry axis to principal stress direction of the in-service steel structure member under the action of the plane stresses. Therefore, in order to adopting the phase spectrum to solve the problem of plane stress determination, the values of the polarization angle must be obtained in the phase spectrum. The invention has further explored to determine the values of the polarization angle.

On the basis that the first response frequency of the phase difference has been captured, the polarization angle of the transverse wave components can be directly obtained as follows using the phase difference derivative function value corresponding to the first response frequency of the phase difference and the known incident angle:

$$\varphi = \theta - \frac{1}{2}\text{arcsec}\frac{\Delta\varphi' f_{max}}{\pi}. \quad (13)$$

The velocities of various forms of ultrasonic wave propagating in solid changes correspondingly with the stress in the solid. This phenomenon is called the acousto elastic effect, and the related theory derived from the acousto elastic effect is called the acousto elastic theory. Through the acousto elastic theory, a relationship between some characteristic parameters of ultrasonic wave and stress can be established. When the in-service steel structure member is subjected to plane stress, the relationship between the propagation velocity of the ultrasonic transverse wave and the plane stresses is shown as follows:

$$B = \sqrt{[B_0 + m(\sigma_1-\sigma_2)\cos2\alpha]^2 + [m(\sigma_1-\sigma_2)\sin2\alpha]^2} \quad (14)$$

$$\tan2\varphi = \frac{m(\sigma_1-\sigma_2)\sin2\alpha}{B_0 + m(\sigma_1-\sigma_2)\cos2\alpha} \quad (15)$$

where, B is a birefringence coefficient of the transverse wave, which characterizes a relative velocity of the transverse wave components and can represent acoustic anisotropy, and its expression is as follows:

$$B = \frac{v_{31}-v_{32}}{(v_{31}+v_{32})/2}. \quad (16)$$

When the member is in an unstressed state, the acoustic anisotropy of the material itself is generated by the factors such as the texture of the material. The birefringence coefficient of the transverse wave obtained at this time is $B_0$. m is composed of second-order and third-order elastic coefficients, indicating the characteristics of the material itself.

Figure 2:
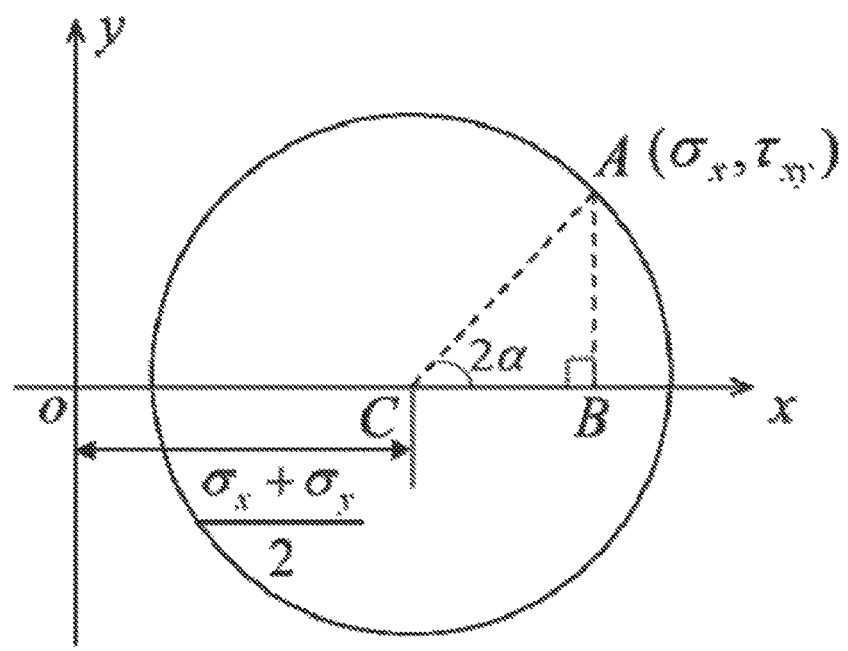
FIG. 2 schematically shows a Mohr's circle of stresses used in the invention.

Since the direction of the principal stress remains unknown before the determination, the principal stress cannot be directly determined. Therefore, the mathematical processing by means of the Mohr's circle is necessary to indirectly obtain the formulas of the normal stress and the shear stress, and the process is schematically shown in FIG. 2. The relationships between normal stress and principal stress, shear stress and principal stress can be obtained from the Mohr's circle:

$$(\sigma_1 - \sigma_2)\cos 2\alpha = \sigma_x - \sigma_y \tag{17}$$

$$(\sigma_1 - \sigma_2)\sin 2a = 2\tau_{xy} \tag{18}$$

The formulas (17) and (18) are substituted into the formulas (14) and (15) to obtain determination formulas of the normal stresses and the shear stress through necessary mathematical processing:

$$\sigma_x - \sigma_y = \frac{B\cos 2\varphi - B_0}{m}, \tag{19}$$

$$\tau_{xy} = \frac{B\sin 2\varphi}{2m}. \tag{20}$$

Since the material is assumed to be elastic during the deformation process and the steel has a large elastic modulus, the dimensional change in the direction of ultrasonic propagation is small when the member is stressed in the elastic range. Therefore, the thickness 1 can be approximately considered to be invariable, that is:

$$\frac{l}{v_0} = t_0 \tag{21}$$

where, $t_0$ is the acoustic time of the transverse wave in the in-service steel structure member under the unstressed state; $v_0$ is the propagation velocity of the transverse wave in the in-service steel structure member under the unstressed state.

When the in-service steel structure member is stressed, a stress of 100 MPa only causes the wave velocity to change by about 0.1%, so that the transverse wave velocity is actually less affected, and the following approximation can be made:

$$v_{32} \approx v_{31} \approx v_0 \tag{22}$$

The relationship between the acoustic time difference P of the transverse wave components and the birefringence coefficient B of the transverse wave is established as follows based on equations (21) and (22):

$$P = 2Bt_0 \tag{23}$$

Equation (23) is substituted into equations (19) and (20) to obtain the following equations through the necessary mathematical processing:

$$\sigma_x - \sigma_y = 2kP\cos 2\varphi - c \tag{24}$$

$$\tau_{xy} = kP\sin 2\varphi \tag{25}$$

where, k and c are related to a thickness of the in-service steel structure member, elastic coefficients of a material and anisotropy of the material itself, and are respectively expressed as follows:

$$k = \frac{1}{4mt_0} = \frac{1}{4t_0} \cdot \frac{-8\mu^2}{4\mu + n}, \tag{26}$$

$$c = \frac{B_0}{m} = \frac{-8\mu^2}{4\mu + n} \cdot B_0. \tag{27}$$

It can be seen from the plane stress determination formulas (24) and (25) that the normal stress difference and the shear stress can be solved by capturing the first response frequency of the phase difference and the maximum value of the derivative function of the phase difference and then calibrating the stress-spectrum parameters k and c. Finally, the normal stresses are separated to obtain all of the three independent stress components through the following shear difference method:

$$(\sigma_x)_p = (\sigma_x)_0 - \sum_0^p \frac{\partial \tau_{xy}}{\partial y} \Delta x. \tag{28}$$

According to the formulas (12), (13), (24), (25) and (28), theoretical formulas for the plane stress determination of the in-service steel structure member based on phase spectrum can be obtained as follows:

$$\varphi = \theta - \frac{1}{2}\mathrm{arcsec}\frac{\Delta\varphi' f_{max}}{\pi} \tag{29a}$$

$$(\sigma_x)_p = (\sigma_x)_0 - \sum_0^p \frac{\partial \tau_{xy}}{\partial y}\Delta x \tag{29b}$$

$$\sigma_x - \sigma_y = \frac{k\cos 2\varphi}{f_{max}} - c \tag{29c}$$

$$\tau_{xy} = \frac{k\sin 2\varphi}{2f_{max}} \tag{29d}$$

where, k and c which can be obtained by parameter calibration are related to a thickness of the in-service steel structure member, elastic coefficients of a material and anisotropy of the material itself, and are expressed in equations (26) and (27). $\theta$ is the incident angle of the ultrasonic transverse wave, which is measurable. $f_{max}$ and $\Delta\varphi'$ can be captured from the derivative function curve of the phase difference. Finally, the normal stresses are separated by the shear difference method to achieve the derivation of theoretical formulas for the plane stress determination of the in-service steel structure member based on the phase spectrum.

It can be concluded from the above theoretical derivation that the method provided herein mainly includes five steps: (1) preparing a replica of the in-service steel structure member; (2) calibrating the stress-spectrum parameters k and c under axial stress state; (3) capturing the first response frequency of the phase difference and the maximum value of the phase difference derivative function of the ultrasonic transverse wave echo; (4) solving a normal stress difference and a shear stress inside the in-service steel structure member; and separating normal stresses by a shear difference method to obtain three independent plane stress components. The five steps are specifically described as follows, respectively.

In step (1), since the in-service steel structure member is generally non-detachable, and the stress-spectrum parameters k and c are required to be calibrated herein, a steel structure member with the same material and thickness as the in-service steel structure member is used as a replica for the calibration of stress-spectrum parameters.

In step (2), the stress-spectrum parameters k and c are calibrated under axial stress. In the plane stress determination formula, the normal stress in one direction and shear stress are set as 0. The principal stress direction is coincided with the orthotropic symmetry axis of the steel structure member, so the polarization angle generated by the transverse wave birefringence is 0. The determination formula of axial stress can be directly obtained as follows:

$$\sigma = \frac{k}{f_{max}} - c \qquad (30)$$

It can be found that the simplified axial stress formula contains all the undetermined parameters in the plane stress determination formula, so the calibration of the stress-spectrum parameters can be converted into the determination of axial stress, and the specific process is described as follows.

(1) The surfaces of the in-service steel structure member and the replica thereof are treated, where the position where the ultrasonic transverse wave probe is placed is polished to ensure that the ultrasonic transverse wave probe and the steel structure member are in close contact. Then the in-service steel structure member and the replica thereof are painted after the measurement.

Figure 3:
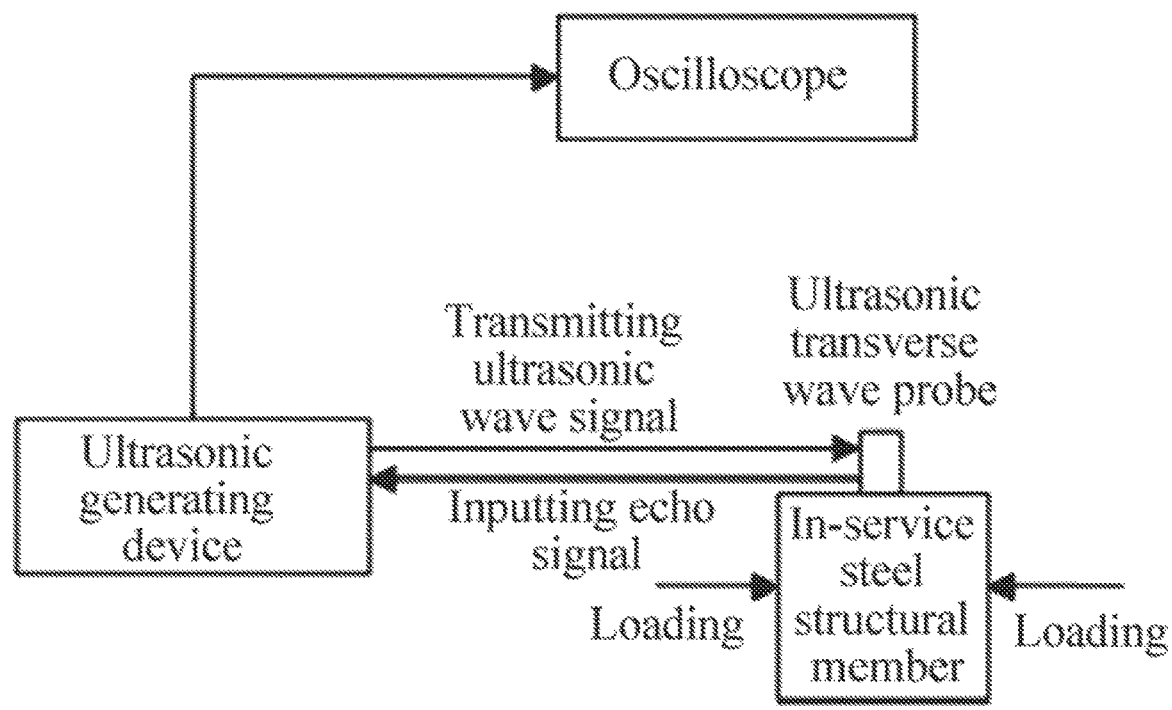
FIG. 3 is a schematic diagram of a system in the invention of determining the plane stress on an in-service steel structure member based on an ultrasonic transverse wave phase spectrum.

(2) As shown in FIG. 3, the instruments are connected and the stress measurement system is debugged to ensure that the ultrasonic signal displayed by the instruments is clear and effective.

(3) The ultrasonic transverse wave probe is fixed on the surface of a test sample. It can be concluded from theoretical analysis that there are obvious frequency domain signal characteristics when the incident angle of the ultrasonic transverse wave is controlled at around 45°, where in the invention, the incident angle of the ultrasonic transverse wave is maintained at 30°.

(4) A set of axial forces are discretely applied to the replica of the in-service steel structure member, where each stress state is kept for 5 min, and the determination data points are ensured to be random. The ultrasonic transverse wave echo signals and corresponding stresses are recorded.

(5) Fourier transform is performed on the ultrasonic signal to convert the time domain ultrasonic transverse wave echo signal into the frequency domain signal to obtain the derivative function curves of the phase difference, from which the first response frequencies respectively corresponding to each stress are extracted.

(6) The reciprocals of the first response frequencies are calculated according to the data obtained in step (5) and the corresponding stresses are obtained. The reciprocals of the first response frequency of the phase difference are linearly fitted with the stress values by least square method to obtain the parameters k and c in equation (30).

In step (3), the process is specifically implemented as follows.

(1) Firstly, the position where the ultrasonic transverse wave probe is placed is polished with sandpaper to remove the paint from the surface and make the surface smooth, so as to ensure that the ultrasonic transverse wave probe and the surface of the in-service steel structure member are in close contact. Then the polished portion is painted after Step (3) is completed.

(2) A strain rosette is stuck on the position where the ultrasonic transverse wave probe is placed and connected to a strain collecting box to obtain the plane stress condition of the determination point.

(3) Coupling agent is applied to the determination portion of the in-service steel structure member. The ultrasonic transverse wave probe is fixed on the in-service steel structure member and connected to the instruments. The determination system is debugged until a stable ultrasonic signal is displayed on the screen of the oscilloscope.

(4) The incident angle of the ultrasonic transverse wave probe is set at 30°, where the adjustment of the angle is completed by an angle fixing plate.

(5) The in-service steel structure member is loaded by a manual hydraulic pump. The stress value can be obtained by the strain rosette, and the signal is collected and saved.

(6) The determination points are kept unchanged, and the ultrasonic transverse wave probe is rotated by 90°, that is, the incident angle is 120°. The signal is collected and saved after it is stable. At this time, a set of data of this determination point has been collected.

(7) The collected signals are processed by a software system to complete the time-frequency domain conversion of the signals, obtaining the derivative function curve of the phase difference of the ultrasonic signals and capturing the first response frequency of the phase difference and the maximum value of the derivative function of the phase difference.

(8) The same operation is subsequently performed on other determination points to obtain the results of signal processing at each point.

In step (4), on the premise that the stress-spectrum parameters k and c are obtained in step (2) and the transverse wave incident angle θ is 30°, the first response frequency of the phase difference and the maximum value of the derivative function of the phase difference of the ultrasonic transverse wave echo of the in-service steel structure member obtained in step (3) are substituted into the formula (29) to calculate the normal stress difference and the shear stress inside the in-service steel structure member.

In step (5), the normal stresses are separated by the shear difference method to obtain all of the three independent plane stress components.

Described below is the determination for the absolute stress of the in-service steel structure member using the method provided herein for determining plane stresses on an in-service steel structure member based on ultrasonic transverse wave phase spectrum. In order to further verify the accuracy of the method, the test for determining the plane stress of a steel structural member and comparative tests are performed below.

Example 1

Figure 4:
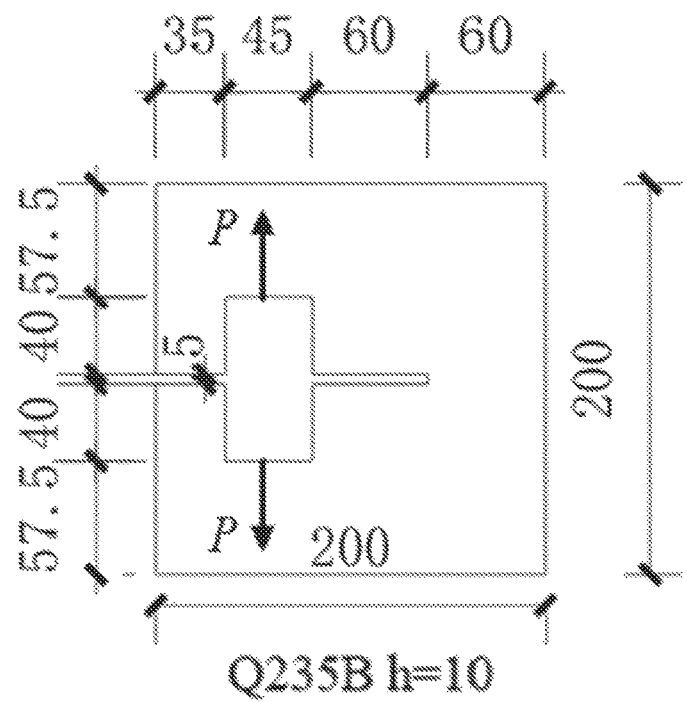
FIG. 4 is a schematic diagram showing the construction of a plane stress field in the invention.

A steel plate A made of Q235B is used herein as the research object to construct the plane stress field. It can be found from the analysis about the factors affecting the axial stress that a smaller thickness will result in a larger amplification parameter of the determination error. However, the thickness of the research object cannot be limitlessly reduced to control the determination error. The thickness of the steel plate A is empirically selected to 1 cm. At the same time, the steel plate A is provided with a rectangular opening to avoid the field having a stress uniformity similar to the axial stress field. Then the steel plate A is loaded in a direction parallel to the plate by placing a hydraulic jack at the rectangular opening. The final plane stress field is schematically shown in FIG. 4, and the plane stress determining system is shown in FIG. 3. In order to ensure that the results are sufficiently reliable, a small test sample B with a size of 45.00 mm×30.00 mm×10.00 mm is produced from portion cut during the opening process for the calibration. The determination was carried out in accordance with the procedures mentioned above.

Figure 5:
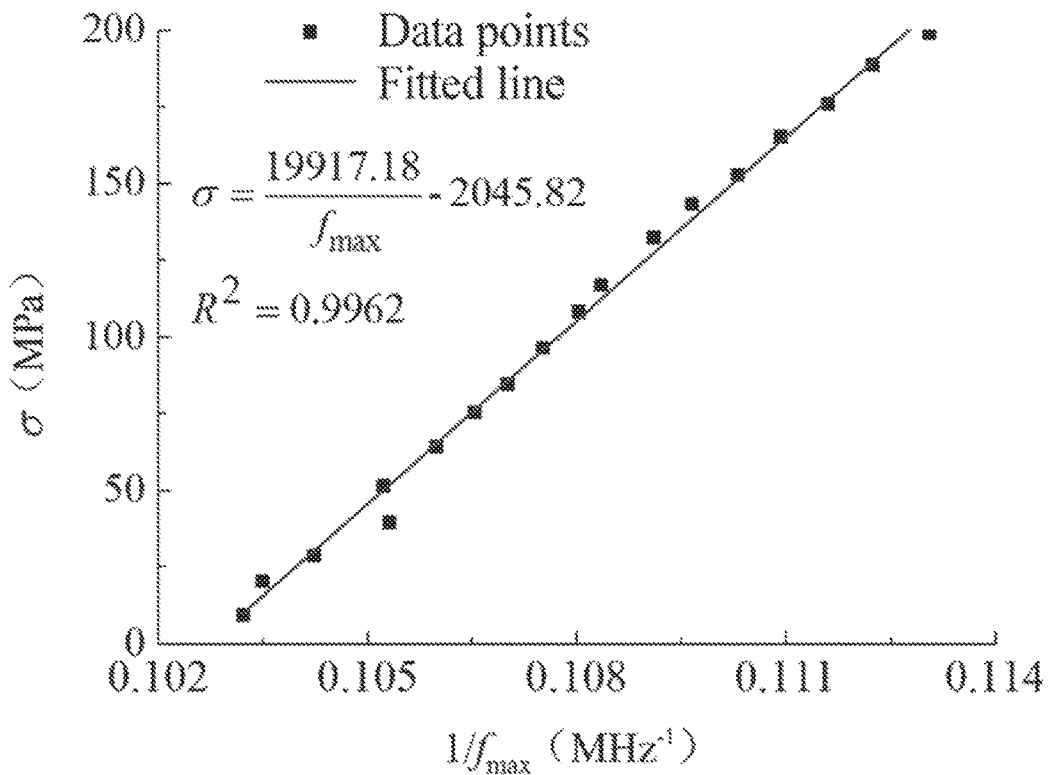
FIG. 5 shows the fitting relationship between the $1/f_{max}$ and $\sigma$ of a steel plate B obtained by the calibrated stress-spectrum parameters in the invention.

In step (1), a replica of the in-service steel structure member is prepared. The steel plate A is assumed as the in-service steel structure member, and in the manufacturing of the steel plate A, a small test sample B with a size of 45.00 mm×30.00 mm×10.00 mm is derived from the portion cut during the opening process and used for the calibration, thereby ensuring the consistence with the steel plate A in thickness and material. The test sample B, i.e., the replica of the in-service steel structure member, is used for the calibration of axial stress, and the plane stress determination for the in-service steel structure member is performed on the steel plate A. In step (2), the calibration of the stress-spectrum parameters k and c under plane stress is replaced by the calibration under axial stress. The test sample B is stepwise loaded, and the first response frequencies and stress values of the derivative function curve of the phase difference under each load are recorded and listed in Table 1. The stress values in Table 1 and the reciprocals of the first response frequencies are fitted using the least square method to obtain a linear relationship between the stress values and the reciprocals of the first response frequencies, as shown in FIG. 5. It can be seen that the stress values of the replica of the in-service steel structure member have a good linear relationship with the reciprocals of the first response frequencies.

TABLE 1

First response frequencies of the test sample B under different stress values

| σ (MPa) | $f_{max}$ (MHz) | σ (MPa) | $f_{max}$ (MHz) |
|---|---|---|---|
| 9.41634 | 9.688984 | 108.09634 | 9.257545 |
| 20.13807 | 9.662769 | 116.56131 | 9.229349 |
| 28.35157 | 9.594167 | 132.33847 | 9.165063 |
| 39.25879 | 9.495774 | 143.19373 | 9.119095 |
| 51.3882 | 9.502993 | 152.87618 | 9.06454 |
| 64.28101 | 9.433962 | 165.24317 | 9.014694 |
| 75.22575 | 9.386146 | 175.8973 | 8.959771 |
| 84.66946 | 9.344048 | 188.77001 | 8.90948 |
| 96.33056 | 9.300595 | 198.83364 | 8.845644 |

Figure 6:
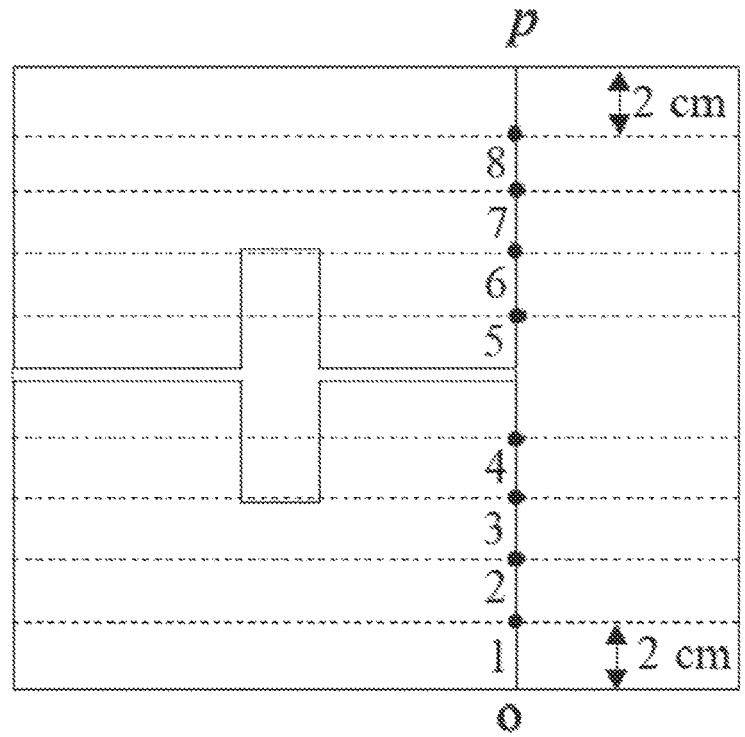
FIG. 6 is a schematic diagram showing positions of plane stress determination points in the invention.

In step (3), the first response frequencies of the phase difference and the maximum values of the derivative function of the phase difference of the ultrasonic transverse wave echoes are obtained. The positions of the determination points on the in-service steel structure member provided herein are shown in FIG. 6. The distance between the determination point 1 and the lower surface of the in-service steel structure member is 2 cm, and the determination points 2, 3, and 4 are selected at an interval of 2 cm. The upper and lower determination points are symmetrically arranged with respect to the horizontal central axis of the in-service steel structure member. The steel plate is determined under the loading state according to the method mentioned above, and the ultrasonic echo signals of each determination point are recorded. The collected signals are processed with the software system to complete the conversion of the time-frequency domain of the signals and obtain the derivative function curves of the phase difference of the ultrasonic wave signals, capturing the first response frequencies of the phase difference and the maximum values of the derivative function curve of the phase difference.

In step (4), the normal stress difference and the shear stress value inside the in-service steel structure member are solved as follows. The stress-spectrum parameters k and c obtained in step (2), the transverse wave incident angle θ of 30°, the first response frequencies of the phase difference and the derivative function curve maximum values of the phase difference of the ultrasonic transverse wave echo of the in-service steel structure obtained in step (3) are substituted into the formula (29) to calculate the normal stress difference and the shear stress inside the in-service steel structure member.

In step (5), the normal stresses are separated by the shear difference method to obtain all of the three independent plane stress components. The normal stress difference and the shear stress value of respective determination points have been obtained through the test. In order to obtain three independent plane stress values, the invention adopts the shear difference method to realize the separation of the normal stresses by solving the plane stress differential equation. The shear difference method is originally used in the photoelastic determination of the plane stress, and its application is relatively full-blown.

Figure 7:
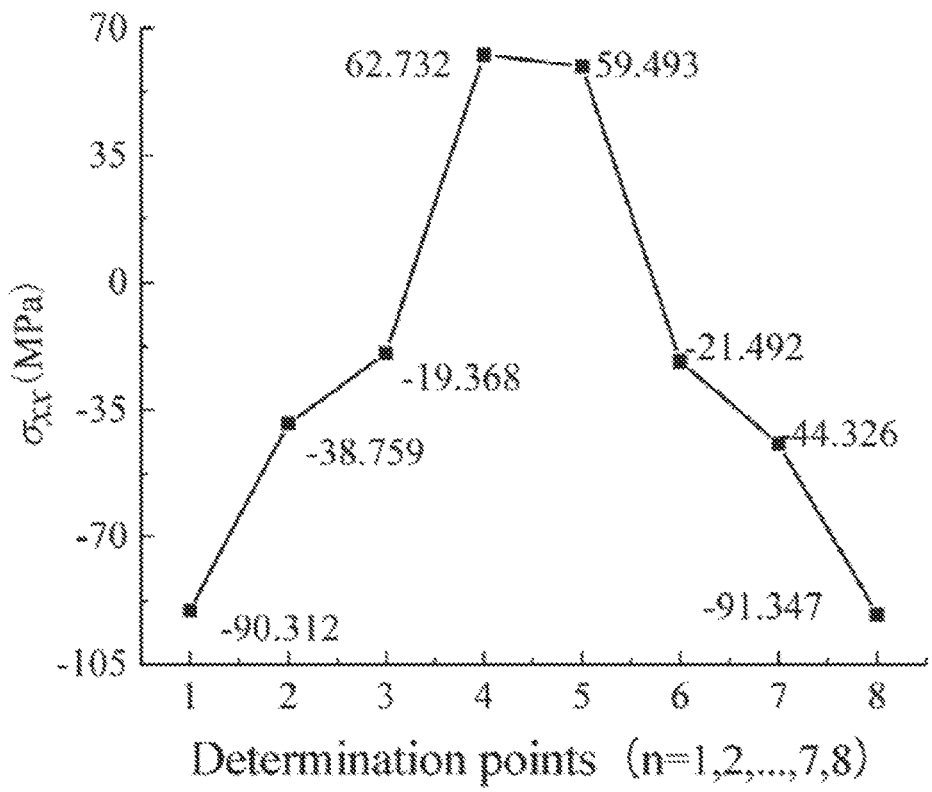
FIG. 7 shows horizontal normal stress values in the plane stress determination of an in-service steel structure member in the invention.
Figure 8:
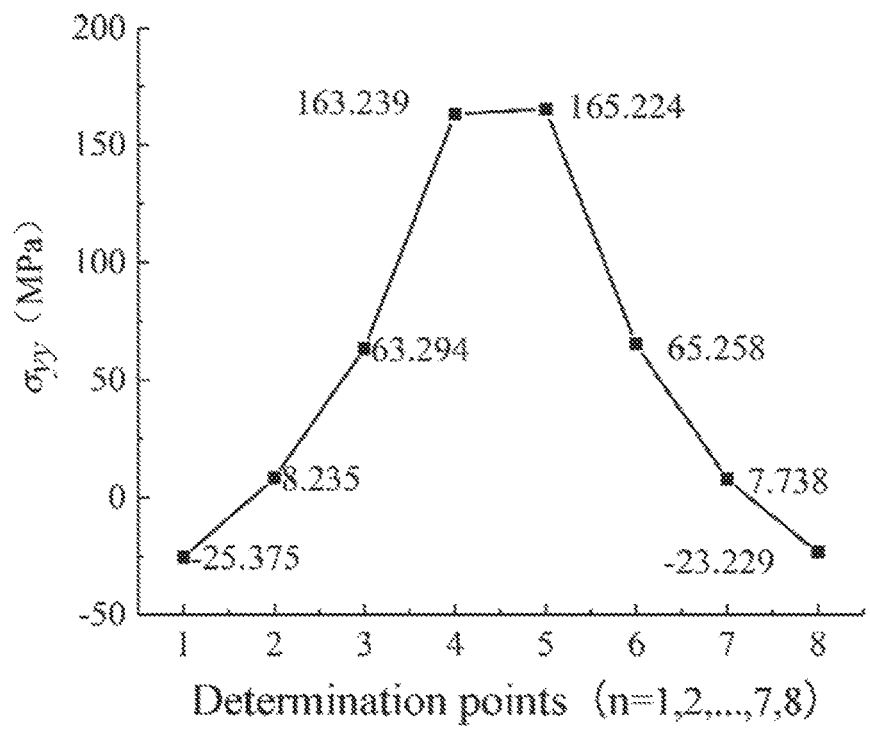
FIG. 8 shows vertical normal stress values in the plane stress determination of the in-service steel structure member in the invention.
Figure 9:
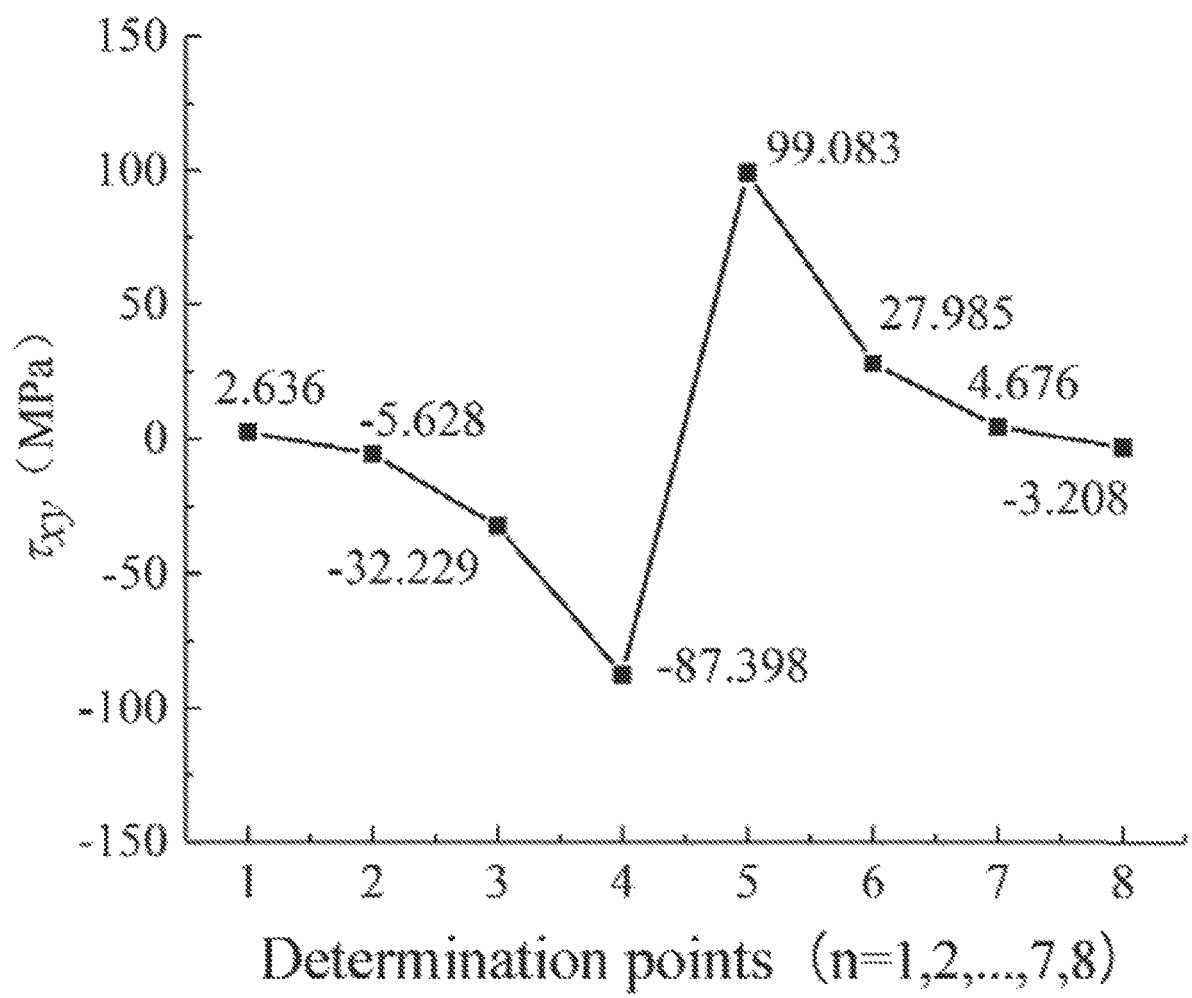
FIG. 9 shows shear stress values in the plane stress determination of the in-service steel structure member in the invention.

The invention realizes the separation of the normal stresses by the shear difference method, thereby realizing the solution of three independent plane stress values. The plane stresses of each determination point are shown in FIGS. 7-9.

Figure 10:
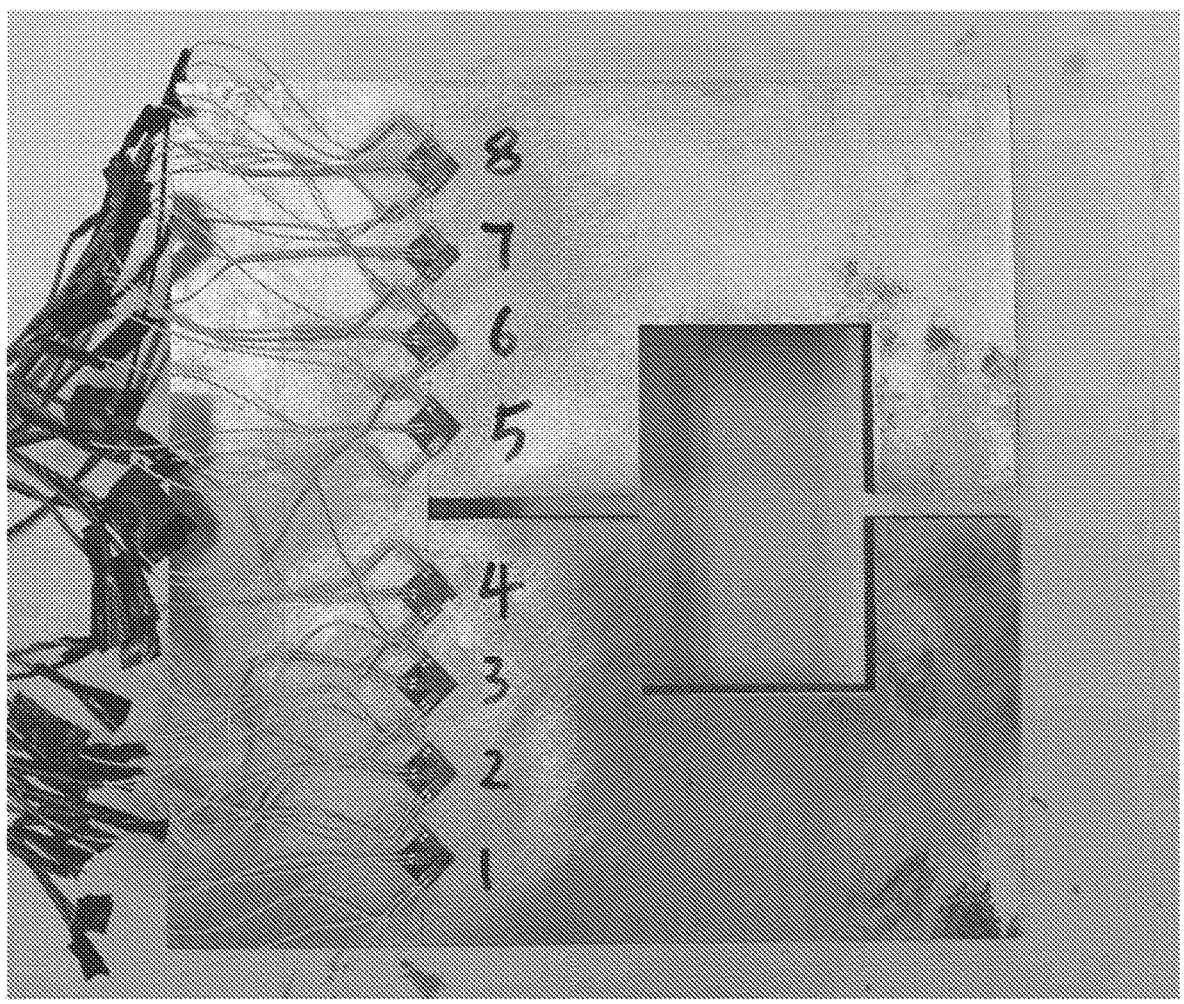
FIG. 10 shows the layout of a strain gauge in the plane stress verification of the in-service steel structure member in the invention.
Figure 11:
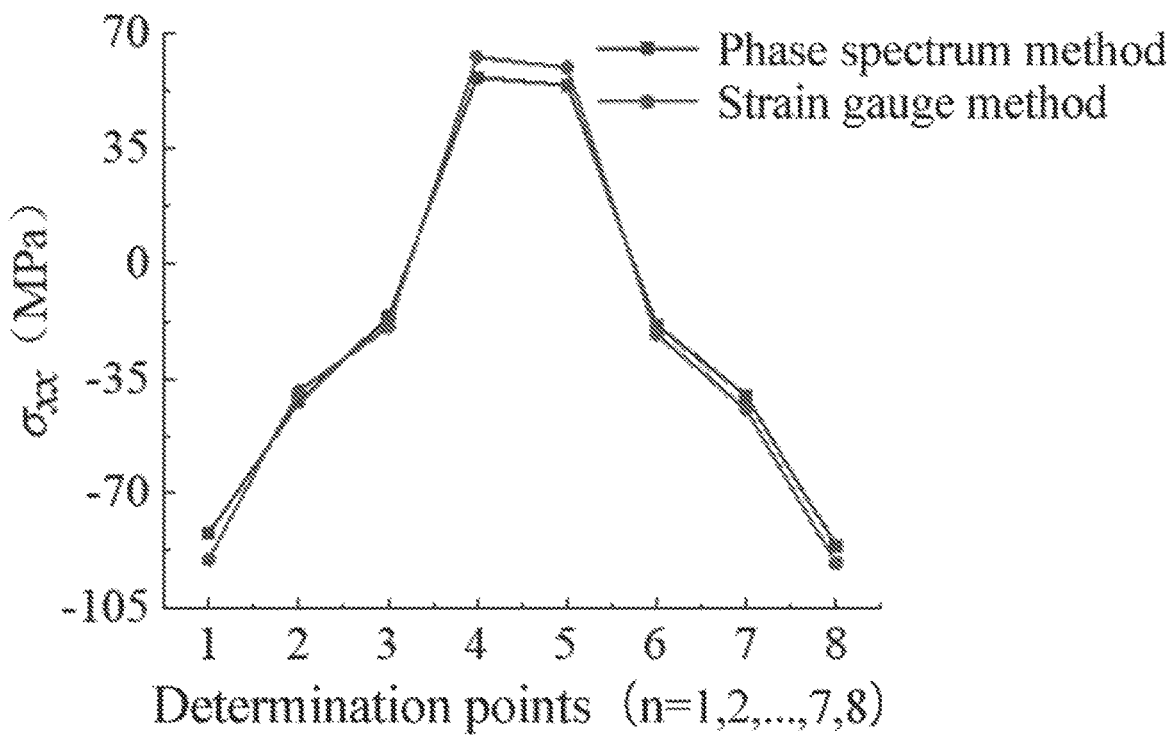
FIG. 11 shows the comparison between the horizontal normal stresses measured according to an embodiment of the invention and the horizontal normal stresses measured by the strain gauge method.
Figure 12:
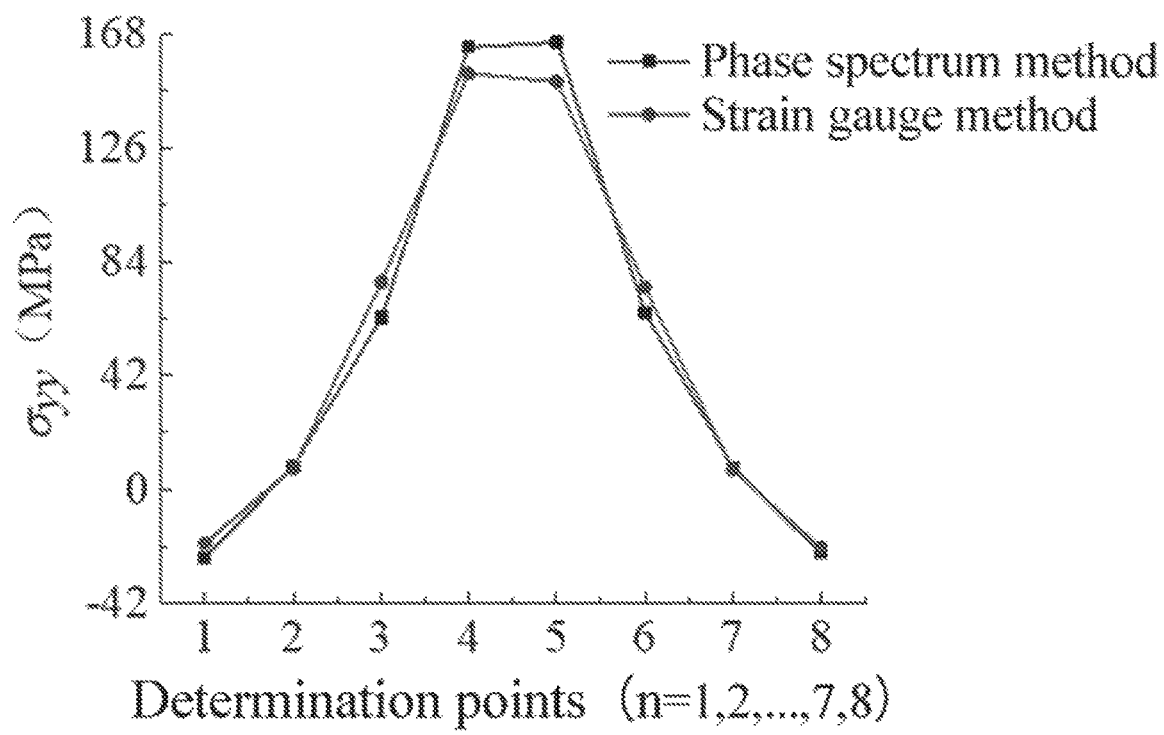
FIG. 12 shows the comparison between the vertical normal stresses measured according to an embodiment of the invention and the vertical normal stresses measured by the strain gauge method.
Figure 13:
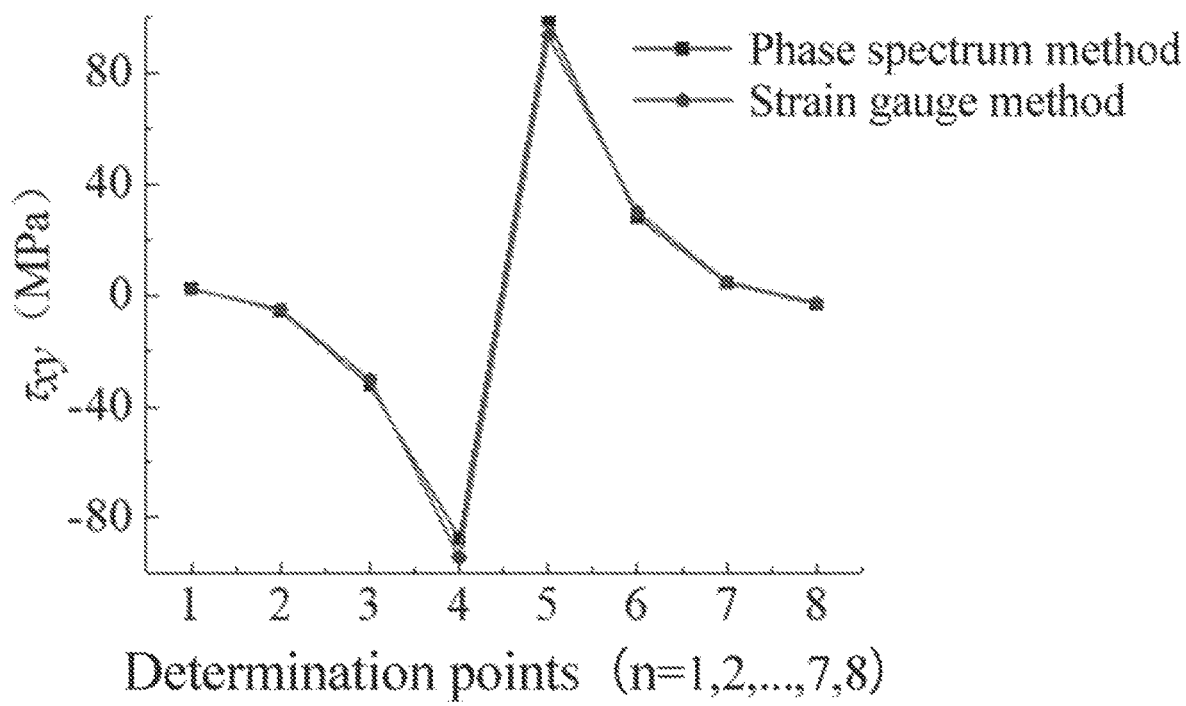
FIG. 13 shows the comparison between shear stresses measured according to an embodiment of the invention and shear stresses measured by the strain gauge method.
Figure 14:
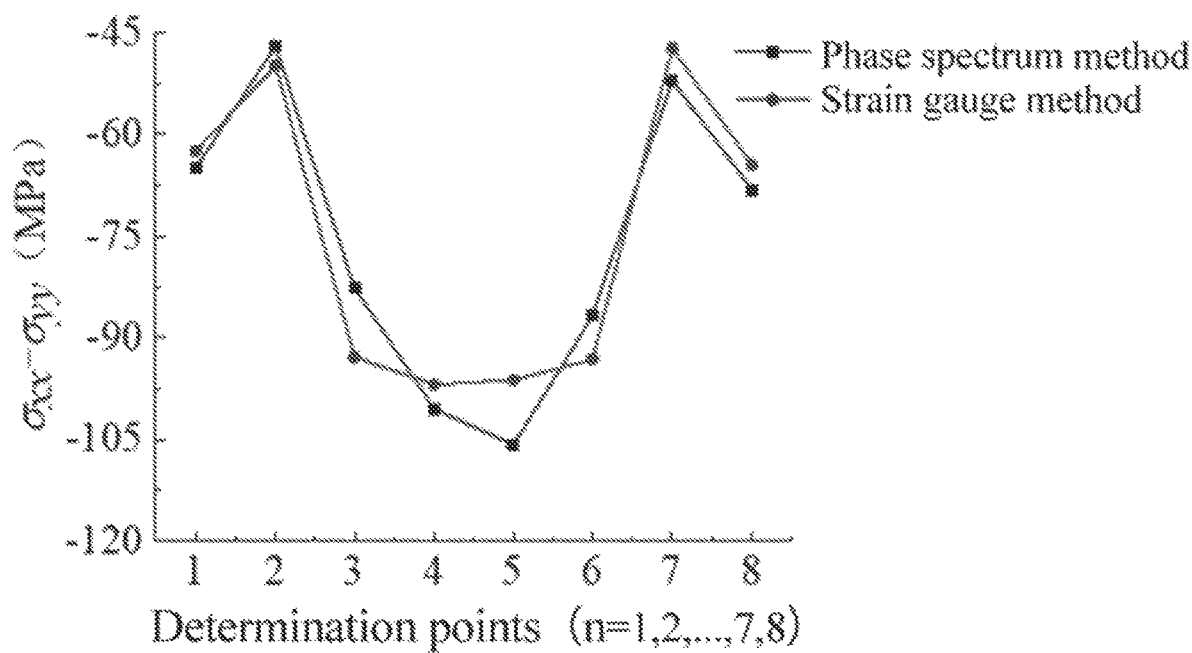
FIG. 14 shows the comparison between the normal stress difference measured according to embodiment of the invention and the normal stress difference measured by the strain gauge method.

Comparative Example 1 Determination of Internal Stress of Steel Sheet by Strain Gauge Method In step (3) of Example 1, when an unknown force is applied to the steel plate A, the unknown force can be measured by the strain gauge method, where the arrangement of the strain gauges is shown in FIG. 10. The results determined by the method provided herein are compared with the stress values collected by the strain gauges, and the comparison results are shown in FIGS. 11-14. It can be found from FIGS. 11-14 that the overall error of the plane stress values obtained by the method of the invention with respect to the true stress values is under control. The determined plane stress trend is consistent with the true plane stress trend, and can reflect the distribution of the plane stresses along a straight line, which demonstrates the effectiveness of the method of the invention.

It can be seen from the comparison between Embodiment 1 and Comparative Embodiment 1 that the method for determining plane stresses on an in-service steel structure member based on phase spectrum of ultrasonic transverse wave proposed herein can realize the non-destructive determination for the plane stress of the in-service steel structure member. There is no extra requirement for the sampling rate of the data acquisition system during the determining. In addition, this method is less affected by the high-frequency noise of the environment and the obtained results are demonstrated to be valid. The instruments employed in the method have simple installation and operation and low cost. Therefore, the method provided herein is suitable for the determination of plane stress of a steel structure member in construction and in service, and can also be used for the determination of welding residual stress and loading stress of other metal components.

Described above are merely preferred embodiments of the invention, which are not intended to limit the invention. Various variations and replacements made by those skilled in the art without departing from the spirit of the invention should fall within the scope of the invention.

What is claimed is:

1. A method for determining plane stresses on an in-service steel structure member based on phase spectrum of ultrasonic transverse wave, comprising:
   step (1) calibrating stress-spectrum parameters k and c of a replica of the in-service steel structure member;
   step (2) determining a first response frequency of a phase difference of an ultrasonic transverse wave echo and a maximum value of a derivative function of the phase difference of the in-service steel structure member to obtain a polarization angle of ultrasonic transverse wave components generated by a birefringence effect of the ultrasonic transverse wave;
   step (3) solving a plane normal stress difference and a plane shear stress inside the in-service steel structure member; and
   step (4) separating normal stresses by a shear difference method to obtain three independent plane stress components.

2. The method of claim 1, wherein in step (2), the first response frequency of the phase difference and the maximum value of the derivative function of the phase difference are obtained by the steps of:
   allowing a signal transmitted by a transmitting-receiving ultrasonic transverse wave probe to propagate in the in-service steel structure member and receiving an echo signal by the transmitting-receiving ultrasonic transverse wave probe; collecting the signal by an oscilloscope; processing data to obtain a function curve of the phase difference; and further obtaining a derivative function curve of the phase difference of the ultrasonic transverse wave echo;
   wherein:
   a frequency corresponding to a point of a first maximum value in the derivative function curve of the phase difference is the first response frequency of the phase difference; and a value corresponding to a point of a maximum value in the derivative function curve of the phase difference is the maximum value of the derivative function of the phase difference.

3. The method of claim 2, wherein the step of collecting the signal by the oscilloscope comprises the following steps:
   transmitting a pulse electrical signal by an ultrasonic pulse emission receiver;
   converting the pulse electrical signal into an ultrasonic transverse wave signal by the transmitting-receiving ultrasonic transverse wave probe;
   allowing the ultrasonic transverse wave signal to propagate in the in-service steel structure member and to be reflected by a bottom surface of the in-service steel structure member;
   converting the ultrasonic transverse wave signal to an electrical signal by the transmitting-receiving ultrasonic transverse wave probe; and
   inputting the electrical signal to the ultrasonic pulse emission receiver by the transmitting-receiving ultrasonic transverse wave probe; and
   collecting the signal by the oscilloscope.

4. The method of claim 3, wherein a center frequency of the transmitting-receiving ultrasonic transverse wave probe is 5 MHz, and a bandwidth range of the transmitting-receiving ultrasonic transverse wave probe is 0~10 MHz.

5. The method of claim 2, wherein the phase difference is a difference value between a phase spectrum of an echo received when an incident direction of the ultrasonic transverse wave is rotated by 90 degrees and a phase spectrum of an echo received in an original incident direction of the ultrasonic transverse wave.

6. The method of claim 1, wherein in step (2), the polarization angle of the ultrasonic transverse wave components is obtained by the following steps:
   recording an incident angle of the ultrasonic transverse wave;
   capturing an abscissa and an ordinate of the point of the first maximum value in the derivative function curve of the phase difference, and taking the abscissa and the ordinate as the first response frequency of the phase difference and the maximum value of the derivative function of the phase difference, respectively; and
   obtaining the polarization angle of the ultrasonic transverse wave components by a theory formula for capturing the polarization angle; wherein the theory formula is expressed as follows:

$$\varphi = \theta - \frac{1}{2}\mathrm{arcsec}\frac{\Delta\varphi' f_{max}}{\pi},$$

where, $\theta$ is the incident angle of the ultrasonic transverse wave; $\Delta\varphi'$ is the maximum value of the derivative function of the phase difference of the ultrasonic transverse wave echo; $f_{max}$ is the frequency corresponding to the point of the first maximum value in the derivative function curve of the phase difference i.e., the first response frequency of the phase difference.

7. The method of claim 1, wherein in step (1), the stress-spectrum parameters k and c are calibrated by the following steps:
   preparing the replica of the in-service steel structure member;
   loading an axial stress on the replica of the in-service steel structure member to be calibrated;
   obtaining a plurality of data pairs of reciprocals of the first response frequency of the phase difference and stresses; and
   obtaining the stress-spectrum parameters k and c for the plane stress determination by fitting the obtained data pairs;
   wherein:
   the stress-spectrum parameters k and c are related to a thickness of the replica of the in-service steel structure member, an elastic coefficient of a material and an anisotropy of the material; and the stress-spectrum parameters k and c are expressed as follows:

$$k = \frac{1}{4mt_0} = \frac{1}{4t_0} \cdot \frac{-8\mu^2}{4\mu+n}, c = \frac{B_0}{m} = \frac{-8\mu^2}{4\mu+n} \cdot B_0,$$

where, m is the elastic coefficient of the in-service steel structure member and the replica thereof; $t_0$ is an acoustic time of the transverse wave propagating in the in-service steel structure member and the replica thereof in an unstressed state; $\mu$ is a second order elastic constant; n is a third order elastic constant; $B_0$ is a birefringence coefficient of the transverse wave when the in-service steel structure member is in the unstressed state.

8. The method of claim 7, wherein the three independent plane stress components $\sigma_x$, $\sigma_y$ and $\tau_{xy}$ satisfy the following equations:

$$\sigma_x - \sigma_y = \frac{k\cos 2\varphi}{f_{max}} - c,$$

$$\tau_{xy} = \frac{k\sin 2\varphi}{2f_{max}},$$

a separation formula of the normal stress is expressed as:

$$(\sigma_x)_p = (\sigma_x)_0 - \sum_0^p \frac{\partial \tau_{xy}}{\partial y} \Delta x,$$

where, $\varphi$ is the polarization angle of the transverse wave components and satisfies $$\varphi = \theta - \frac{1}{2}\arcsec\frac{\Delta\varphi' f_{max}}{\pi};$$

$f_{max}$ is the frequency corresponding to the point of the first maximum value in the derivative function curve of the phase difference and $$f_{max} = \frac{1}{2P},$$

where P is an acoustic time difference of the transverse wave components generated by a birefringence effect and $$P = \frac{2l}{v_{31}} - \frac{2l}{v_{32}};$$

l represents the thickness of the in-service steel structure member and the replica thereof; $v_{31}$ is a velocity of a transverse wave having a propagation direction perpendicular to the stress and a polarization direction perpendicular to the stress; $v_{32}$ is a velocity of a transverse wave having a propagation direction perpendicular to the stress and a polarization direction parallel to the stress.

9. The method of claim 1, wherein the derivative function of the phase difference of the ultrasonic transverse wave echo is expressed as:

$$\Delta\varphi' = \begin{cases} \frac{2\pi P\sec^2(\pi Pf)\cos(2(\theta-\varphi))}{1+\tan^2(\pi Pf)\cos^2(2(\theta-\varphi))} & \left(f \neq \frac{2N-1}{2P}\right) \\ 2\pi P\sec(2(\theta-\varphi)) & \left(f = \frac{2N-1}{2P}\right) \end{cases},$$

$(N = 1, 2, 3, \ldots)$, where P is the acoustic time difference of the transverse wave components generate by the birefringence effect and $$P = \frac{2l}{v_{31}} - \frac{2l}{v_{32}};$$

represents the thickness of the in-service steel structure member and the replica thereof; $v_{31}$ is the velocity of the transverse wave having a propagation direction perpendicular to the stress and a polarization direction perpendicular to the stress; $v_{32}$ is the velocity of the transverse wave having a propagation direction perpendicular to the stress and a polarization direction parallel to the stress; f is the frequency; $\theta$ is the incident angle of the ultrasonic transverse wave; and $\varphi$ is the polarization angle of the transverse wave components.

* * * * *